United States Patent
Appleton et al.

(10) Patent No.: US 6,729,835 B2
(45) Date of Patent: May 4, 2004

(54) HANDLING ASSEMBLY FOR FIXTURING OPHTHALMIC LENSES

(75) Inventors: William J. Appleton, Rochester, NY (US); Marc Bergendahl, Jericho, VT (US); Ted Foos, Rochester, NY (US); David Lewison, Larchmont, NY (US); Raymond H. Puffer, Jr., Watervliet, NY (US); Sunil Singh, Belmont, CA (US)

(73) Assignee: Bausch & Lomb Incorporated, Rochester, NY (US)

( * ) Notice: Subject to any disclaimer, the term of this patent is extended or adjusted under 35 U.S.C. 154(b) by 34 days.

(21) Appl. No.: 10/112,375

(22) Filed: Mar. 28, 2002

(65) Prior Publication Data

US 2003/0185662 A1 Oct. 2, 2003

(51) Int. Cl.$^7$ .................................................. B25J 11/00
(52) U.S. Cl. ........................ 414/755; 414/405; 414/758; 414/761; 414/762; 414/763; 414/773; 414/800
(58) Field of Search .................................. 414/754, 755, 414/758, 761, 762, 763, 773, 405, 800

(56) References Cited

U.S. PATENT DOCUMENTS

| | | | |
|---|---|---|---|
| 3,871,803 A | 3/1975 | Beattie | 425/175 |
| 4,123,098 A | 10/1978 | Shoup | 294/1 CA |
| 4,905,819 A | 3/1990 | Clements | 206/5.1 |
| 5,085,013 A | 2/1992 | Ascosi | 51/277 |
| 5,127,517 A | 7/1992 | Clements | 206/5.1 |
| 5,466,147 A | 11/1995 | Appleton | 425/412 |
| 5,537,108 A | 7/1996 | Nathan | 340/825.84 |
| 5,788,706 A | 8/1998 | Deminski | 606/107 |
| 5,965,172 A | 10/1999 | Wang | 425/186 |

FOREIGN PATENT DOCUMENTS

| | | | | |
|---|---|---|---|---|
| EP | 0825013 A1 | 2/1998 | | B29D/11/00 |
| EP | 0941829 A1 | 9/1999 | | B29C/33/30 |
| FR | 2416691 | 9/1979 | | A61L/3/00 |
| GB | 2360730 A | 10/2001 | | B29C/33/44 |
| WO | 00/46016 | 8/2000 | | B29D/11/00 |
| WO | 01/32408 | 5/2001 | | B29D/11/00 |
| WO | 01/74575 | 10/2001 | | B29D/11/00 |

*Primary Examiner*—Donald W. Underwood
(74) *Attorney, Agent, or Firm*—Katherine McGuire

(57) ABSTRACT

An assembly for orienting and fixturing an array of contact lenses in a lens-fixturing tray to enable automated picking of the lenses includes an array of tubes to which a first support tray having an array of lens receptacles each having a respective contact lens therein is removably mounted. A lens-fixturing tray having an array of lens receptacles is removably mounted to the other end of the tubes and the assembly is rotated and submerged in a fluid bath whereby the lenses release from the first support tray and float downwardly through a respective tube coming to rest in a centered, concave side-up position in a respective receptacle of the lens-fixturing tray.

15 Claims, 7 Drawing Sheets

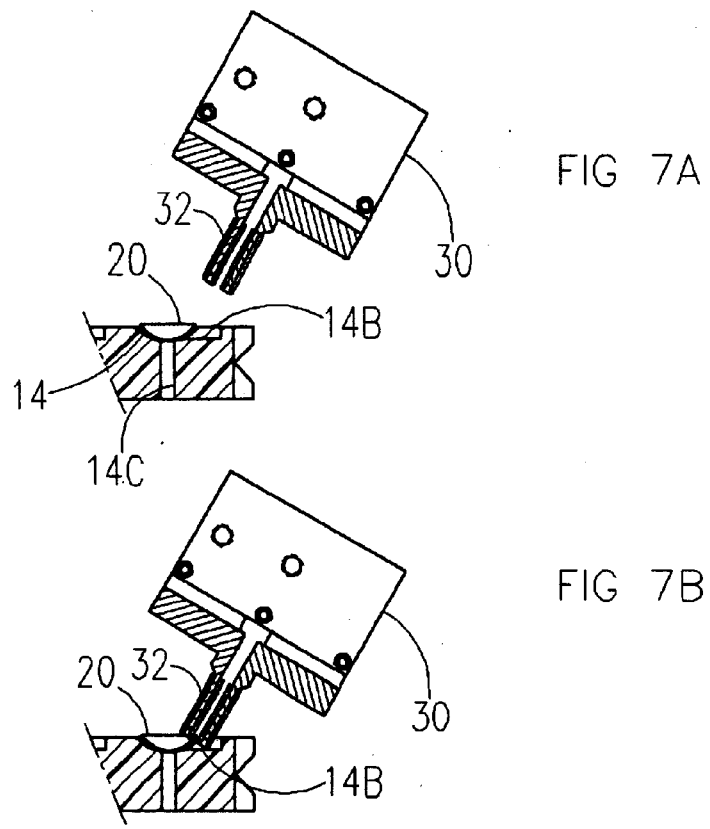
FIG 7A
FIG 7B
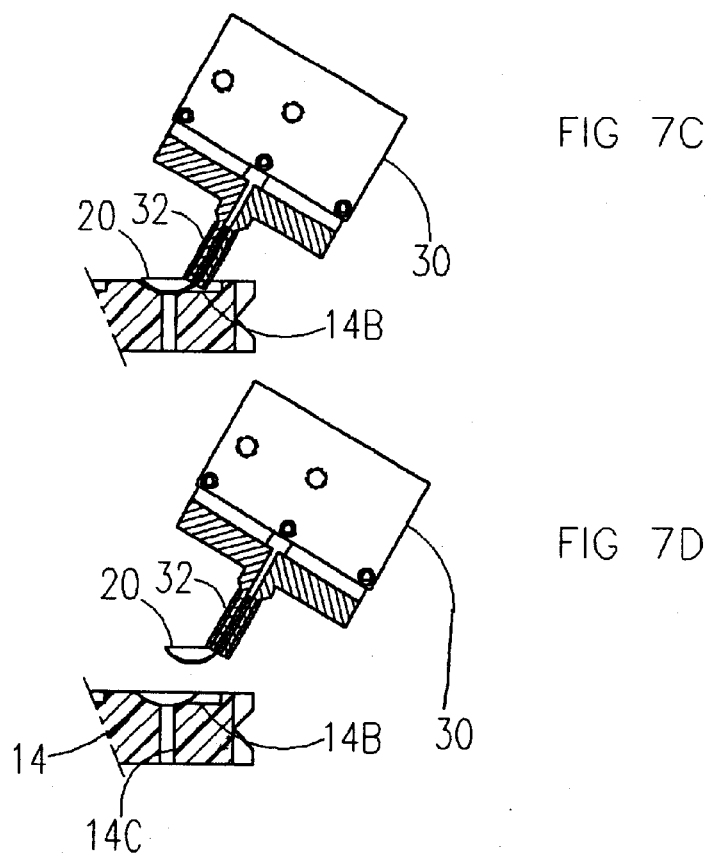
FIG 7C
FIG 7D

HANDLING ASSEMBLY FOR FIXTURING OPHTHALMIC LENSES

BACKGROUND OF THE INVENTION

The present invention generally relates to industrial material handling. More particularly, the present invention relates to a unique handling assembly for precisely orienting and fixturing an array of wet contact lenses between manufacturing processing stations to facilitate the automated handling thereof Although the invention is described and shown herein as directed toward contact lens manufacturing, it is understood that the invention may be used to orient and fixture other, similarly shaped work pieces (e.g., intraocular lenses).

Contact lens manufacturing, especially soft contact lens molding manufacturing, has become a very automated process in recent years, although there still remains points along some manufacturing platforms requiring direct human handling of the individual lenses. Human handling of contact lenses in a manufacturing line is extremely labor intensive and prone to worker injury in the nature of carpel tunnel syndrome, for example. It is therefore desirable to remove, to the fullest extent possible, direct contact lens handling by workers in a manufacturing facility and replace the manual handling step involved with automated apparatus and methods.

Contact lenses are small, fragile articles of manufacture which require precise optical surfaces. As such, contact lenses are extremely susceptible to scratching and tearing. It is therefore desirable to minimize occurrences of direct touching of the lenses with machine parts. In order to apply automated machinery and methods to contact lens handling, the lenses themselves must be precisely located and fixtured as they travel from one processing station to the next so that the automated machinery can locate and pick the lenses. Should the lenses be shifted slightly and/or oriented differently from their intended locations and orientations, the automated handling will fail and therefore add significantly to the manufacturing operation. Fixturing contact lenses through the various processing stations in a contact lens manufacturing line is a very difficult process to control with the precision required of automation machinery.

Cast molding of contact lenses is known. See, for example, U.S. Pat. No. 5,466,147 issued to Bausch & Lomb Incorporated, the entire reference of which is incorporated herein by reference. A single mold unit comprises a female mold section having a concave optical surface and a male mold section having a convex optical surface. The female and male mold sections are complimentary shaped and mateable to form a lens-molding cavity between the facing concave and convex optical surfaces of the female and male mold sections, respectively.

The basic process for cast molding a lens is as follows. A quantity of liquid lens material (monomer) is dispensed into the concave optical surface of the female mold section and the male mold section is seated upon the female mold section with the concave and convex surfaces thereof facing one another to form a lens-shaped mold cavity. The joined female and male mold sections form a single mold unit which is subject to a curing cycle (e.g., by thermal or UV radiation) thereby causing polymerization of the lens material in the mold cavity. Once the lens material has cured, the male and female mold sections must be separated to retrieve the cured lens.

The opening or release of the mold sections must be carried out in a manner which will not harm the delicate lens. Once the lens has polymerized in the mold cavity, the lens and any lens flash will have an adhesive bond to the opposite concave and convex mold surfaces. Thus, the release of the male mold section from the female mold section must be of a force strong enough to break the adhesive bond of the lens and lens flash to the opposing mold surfaces, yet not so strong or haphazard that the optical surfaces of the lens are harmed by the release process. Should the lens crack or be otherwise damaged during the mold release process, the lens must be scrapped, thereby lowering the output yield and increasing manufacturing costs.

Once the mold sections have been separated, the lens must be released from the mold section on which it is retained. Both wet and dry release methods of lens release have been proposed in the prior art. In wet lens release methods, an aqueous solution is used to wet the hydrophilic lens which absorbs water and swells, causing the lens to separate from the mold surface. Once the lens has hydrated and released from its associated mold surface, the lens becomes a free-floating body in the hydrating fluid. If this process is carried out in a bath, there must thus be some means to contain the hydrated lens, yet not inhibit the access of the hydrating fluid to the interior of the mold and lens. Otherwise, the lenses must be manually "fished out" from the hydration bath using tweezers, a very labor intensive prospect.

Typically, the molds in which the lenses have been cured are carried on a support tray in a predetermined array. Once the molds have been opened, the mold sections carrying the adhered lenses are transferred to a lens release station as discussed above. Once the lens has been released form the mold in which it is carried, the lenses are readied for further processing (e.g., hydration, extraction and plasma treatment).

It is desirable to be able to batch process contact lenses through the different stations of a manufacturing process for efficiencies of manufacturing. It is thus desirable to be able to fluid process contact lenses in batches. Various methods of batch processing contact lenses through a fluid processing step have been proposed. The handling of the lenses during fluid processing include processes where the lenses are still in the mold or, alternatively, the lenses have been transferred to a different receptacle. It is furthermore known to use a bath process where batches of lenses may be submerged in a bath of fluid. It is also known to use sequential baths to ensure adequate fluid processing of the lenses. Alternatively, fluid may be applied to each individual contact in metered amounts, followed by extraction of the fluid from the mold section without disturbing the lens.

An example of bath hydration may be seen in commonly owned, co-pending UK application no. 0007930.1 filed on Mar. 31, 2000. In this method, a pallet containing an array of female mold section having respective lenses adhered thereto is stacked on a pallet having a like array of empty male mold sections thereon. An empty pallet is stacked upon the female pallet to prevent the female mold sections from falling from the female pallet during hydration. The stack of three pallets form a single unit for bath hydration, although multiple units may be stacked together and placed in a carrier for submerging in the bath. The pallets are cooperatively configured such that the female and male mold sections are spaced by an amount sufficient to allow fluid to enter between the facing sections to reach the lens, but spaced small enough so as to prohibit the hydrated, loose lens from escaping from between the respective female and male mold sections. This method is especially geared toward a manufacturing method where the male mold section is used for packaging of the contact lens as seen in U.S. Pat.

No. 5,537,108 which is of common ownership with the instant application for patent.

In the case where the lenses must be transferred from the mold in which they were formed to a separate package for downstream processes (e.g., hydration and inspection) and/or for final packaging to the consumer (e.g., transfer to a blister package), the lenses must undergo some amount of handling to effectuate this transfer process. In prior art methods, lenses have been transferred manually by an operator using a pair of tweezers to grasp the lens and transfer it from the mold to a package receptacle. This, of course, is an extremely labor intensive method of lens handling and also creates a high chance of lens damage caused by the direct contact with the tweezers and the operator's inability to consistently control the amount of force used with the tweezers when handling a lens. The use of pick-and-place units is also known for transferring lenses between stations, however, this must also be carried out with extreme precision so as to not damage or dislocate the lens during transfer.

It is thus clear that lens handling is a critical parameter in the contact lens manufacturing line. Since contact lenses are extremely delicate, small articles of manufacture having precise optical surfaces, they must be handled with extreme care so as to not damage the lens which increases costs to the manufacturing operation. It is thus an object of a contact lens manufacturing line to use a contact lens handling system which minimizes the amount of direct contact of the handling apparatus with the lenses, yet also achieves consistent lens positioning and location to enable a robust, automated handling process.

SUMMARY OF THE INVENTION

The present invention provides an assembly and method for precisely orienting and positioning an array of contact lenses in respective receptacles of a support tray. With the lenses in known positions and orientations on the support tray, they may be further easily handled by a robotic assembly.

Once lenses have been molded and the molds have been opened, the lenses are hydrated and presented in a suitable carrier for the lens positioning station of the present invention. The invention utilizes an array of tubes which are removably mounted upon the first lens support tray with each tube aligning with a respective receptacle and lens on the first support tray. At this point, the lenses are not in a precise location within their respective receptacles on the first support tray. A second, lens-centering tray having an array of lens receptacles is removably mounted to the end of the tubes opposite the first support tray with the receptacles thereof also aligning with the tubes. The assembly comprising the lens trays and tubes is then rotated 180° such that the first support tray with lenses thereon is now above the tubes and the lens-centering tray is beneath the tubes. The assembly is then completely submerged into a fluid bath. The fluid passes through openings provided in the lens-centering tray which fills the tubes with fluid, eventually reaching the lenses in the first support tray at the top of the tubes. Once the lenses are submerged in the fluid, the lenses release from their respective receptacles in the support tray and float downwardly through their respective tubes to the lens-centering tray. Due to the curvature of the concave-convex lenses, the lenses will automatically flip as they float downwardly such that they all settle in the concave side-up position within their respective receptacles in the lens-centering tray.

Once all the lenses have settled on the lens-centering tray, the assembly is raised from the fluid bath. A vaccuum source attached to the second support tray is activiated which holds each lens within its respective receptacle in the second support tray. With the tubes guiding the lens downwardly to a respective receptacle, the lenses all settle in a precisely centered location within a respective receptacle. As such, it is then a simple matter for a robotic assembly to pick each lens from its respective receptacle for transfer to another processing station.

BRIEF DESCRIPTION OF THE DRAWINGS

FIG. 1A is a cross-sectional view as taken generally along the line 1a—1a of FIG. 1;

FIG. 1B is a cross-sectional view as taken generally along the line 1b—1b of FIG. 1;

FIGS. 7A–7D are schematic, side elevational views showing the lens-picking sequence.

DETAILED DESCRIPTION

Figure 1:
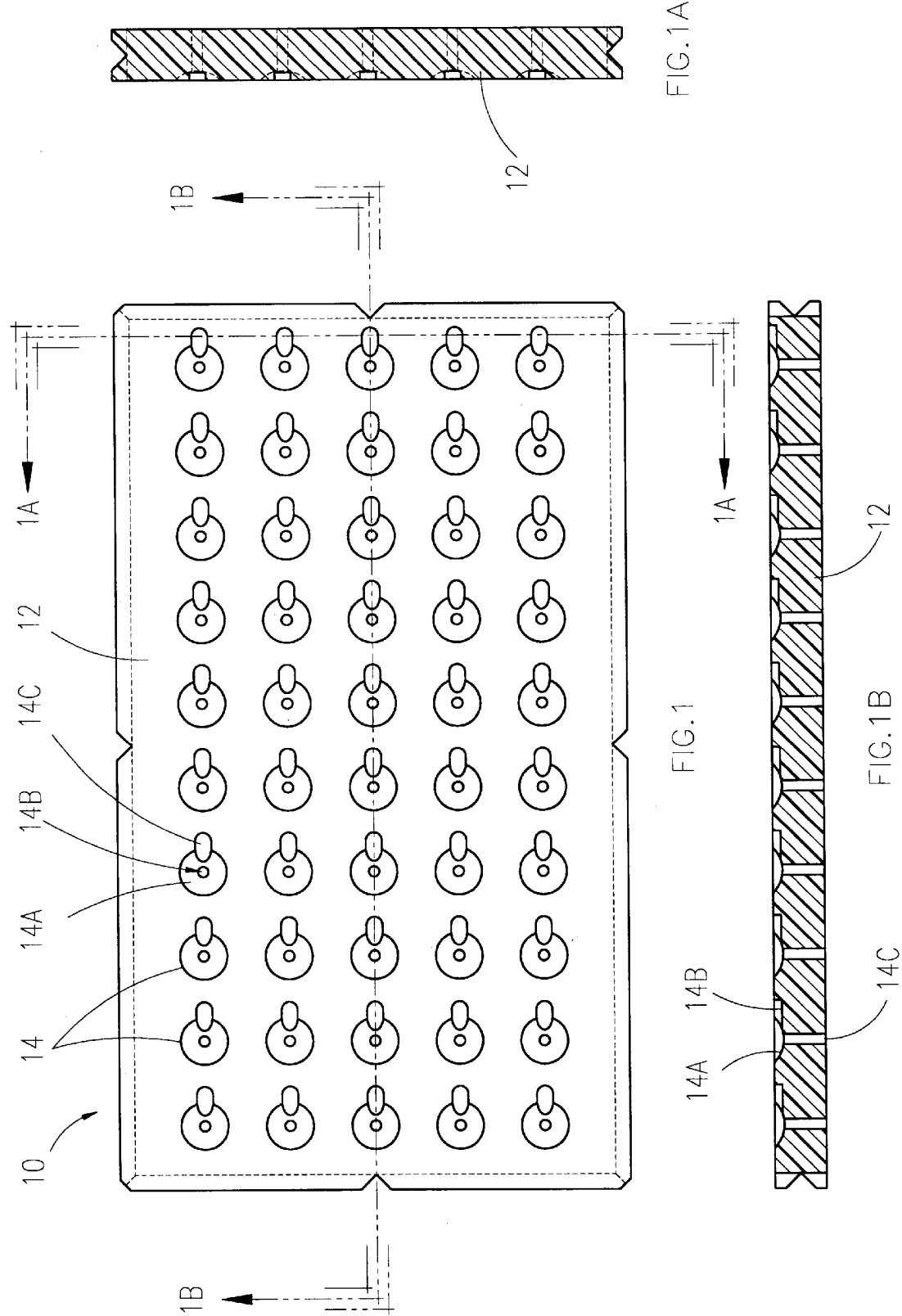
FIG. 1 is a plan view of the lens-fixturing tray of the present invention.

Referring now to the drawing, there is seen in FIGS. 1, 1A and 1B the lens-fixturing tray 10 of the present invention comprising a support 12 with an array of lens receptacles 14 formed therein. Each receptacle 14 is configured to hold and precisely locate a respective lens therein in a concave side-up position for picking by an automatic lens picker. More particularly, each receptacle 14 includes a concave recess 14A, and may preferably further include a vacuum line 14B located at the center of recess 14A, and a lens-picking slot 14C extending radially from a respective recess 14A to provide an access point for the lens-picking device.

Figure 2:
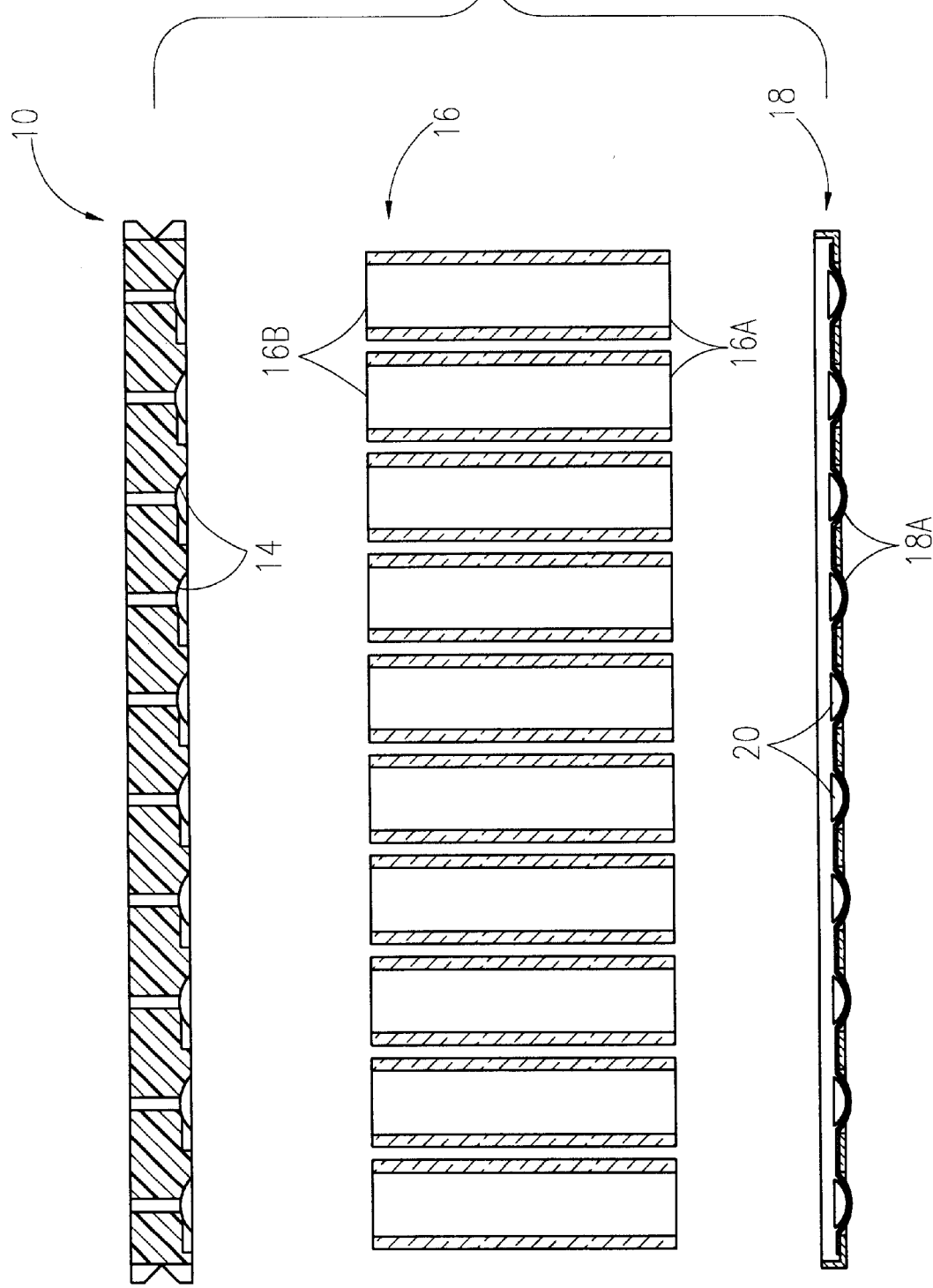
FIG. 2 is a side elevational view in section showing the lens trays in spaced relation below and above the array of fluid tubes in position for assembly.
Figure 3:
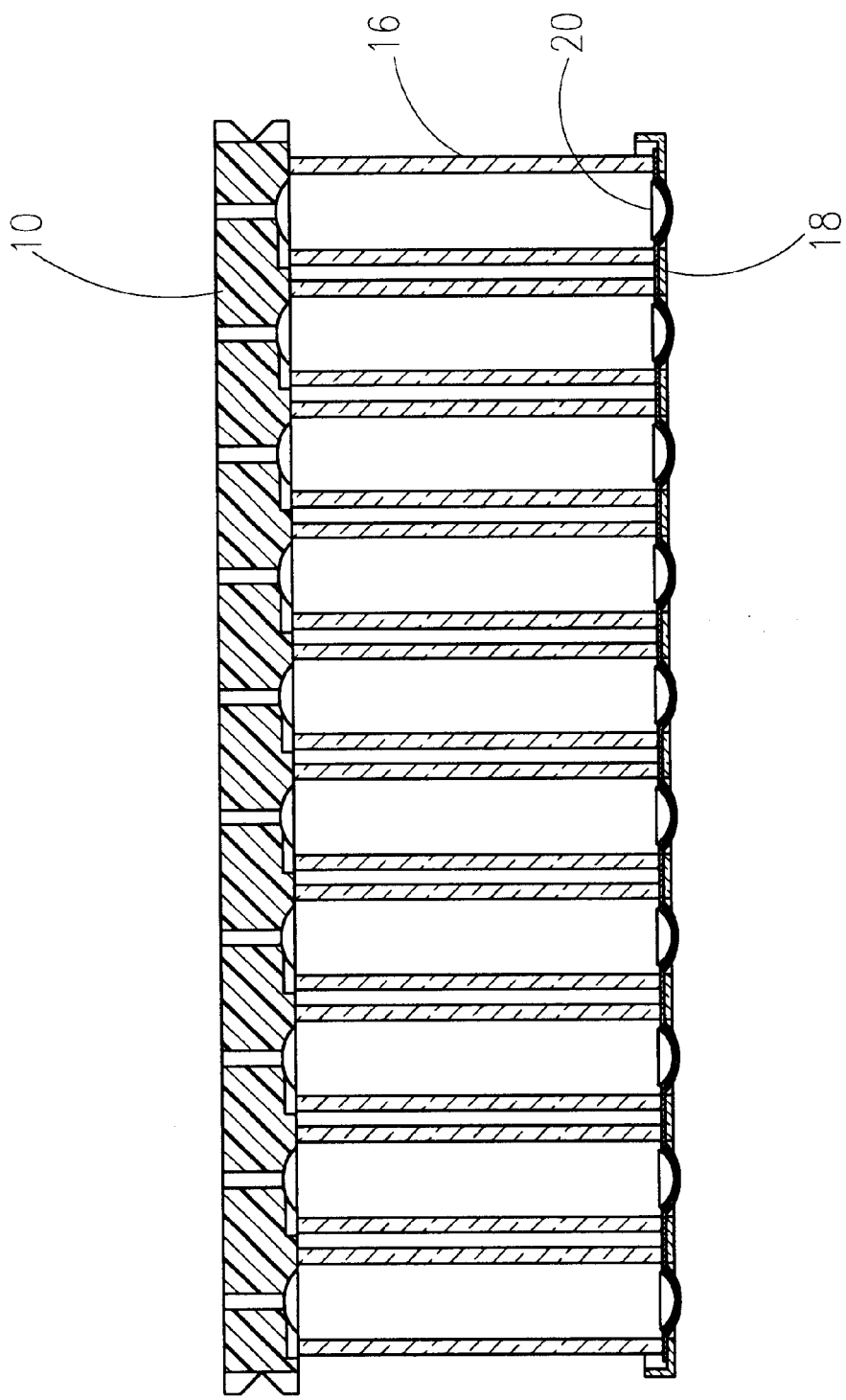
FIG. 3 is the view of FIG. 2, except the lens trays are joined to the array of fluid tubes in the intended manner.

Referring to FIGS. 2 and 3, the assembly of the invention is shown in its preferred embodiment as including three main components: the lens-fixturing tray 10; an array of tubes 16; and a first lens support tray 18. When the lenses are first cast molded and removed from their respective molds, they may first be subjected to various lens processing operations including, for example, hydration, extraction and plasma treatment. During these lens treatment processes, the lenses may be positioned on a first support tray, such as tray 18, for example. Tray 18 may take the form of the mesh tray disclosed in commonly-owned, copending application Ser. No. 09/684,644 filed on Oct. 10, 2000, the entire reference of which is incorporated herein by reference, although other support trays may be used as desired. It is emphasized here that the manner by which the lenses are presented to the tubes is not a critical parameter to the working of the present invention. First support tray 18 is thus one of many possible methods of presenting the lenses to the tubes for orienting and fixturing the lenses as described hereinafter.

As seen in FIG. 2, each lens 20 is held in a respective receptacle 18A in first support tray 18 upon presentation to the lens fixturing and positioning station of the present invention. Although the lenses 20 are shown in FIG. 2 as being all concave side-up and centered in their respective receptacles 18A, there is no assurance that this will always be the case in a production environment. This is because there is nothing controlling the precise lens positioning in first support tray 18. As such, the lenses may thus come to rest in a variety of orientations (concave side-up or down) and/or off-center from their respective receptacle 18A. Without precise positioning of the lenses in their receptacles, it would not be practical to attempt robotic picking of the lenses 20 from first support tray 18 since the robotic picker requires very precise, known locations from which to pick a lens.

The present invention transfers lenses 20 from their random positioning on support tray 18 to very precise positioning on lens-fixturing tray 10 as follows. Referring still to FIG. 2, first support tray 18, with lenses 20 located within respective receptacles 18A thereon, is removably mounted to open ends 16A of an array of tubes 16, with the number of individual tubes 16 equaling and aligning with respective lens receptacles 18A on support tray 18. The inner diameter of each tube 16 is preferably slightly larger than the corresponding diameter of receptacles 18A such that when first support tray 18 is mounted to the array of tubes 16, each lens 20 is completely surrounded by a respective tube 16. It is intended that the array of tubes 16 be conveniently held together in an array to facilitate handling thereof, and this may be accomplished in any desired manner, e.g., through the use of a bracket or the like (not shown). Also, tray 18 is removably yet securely mounted to tubes 16 in any desired manner, e.g., by using clamps (not shown) at the perimeter of the tubes and tray. It is furthermore understood that although the invention is described and shown herein as processing lens arrays of 5 by 10 at a time (total of 50 lenses), any desired number and array configuration of tray receptacles, lenses and tubes may be used to carry out the purposes of the invention.

Referring still to FIGS. 2 and 3, lens-fixturing tray 10 is removably mounted to the array of tubes 16 at the opposite open ends 16B thereof in essentially the same manner as first support tray 18. Thus, each lens receptacle 14 in tray 10 is aligned with a respective tube end 16B. The assembled unit comprising the first support tray 18 with lenses 20 thereon, the array of tubes 16 and the lens-fixturing tray 10 is shown in FIG. 3.

Figure 4:
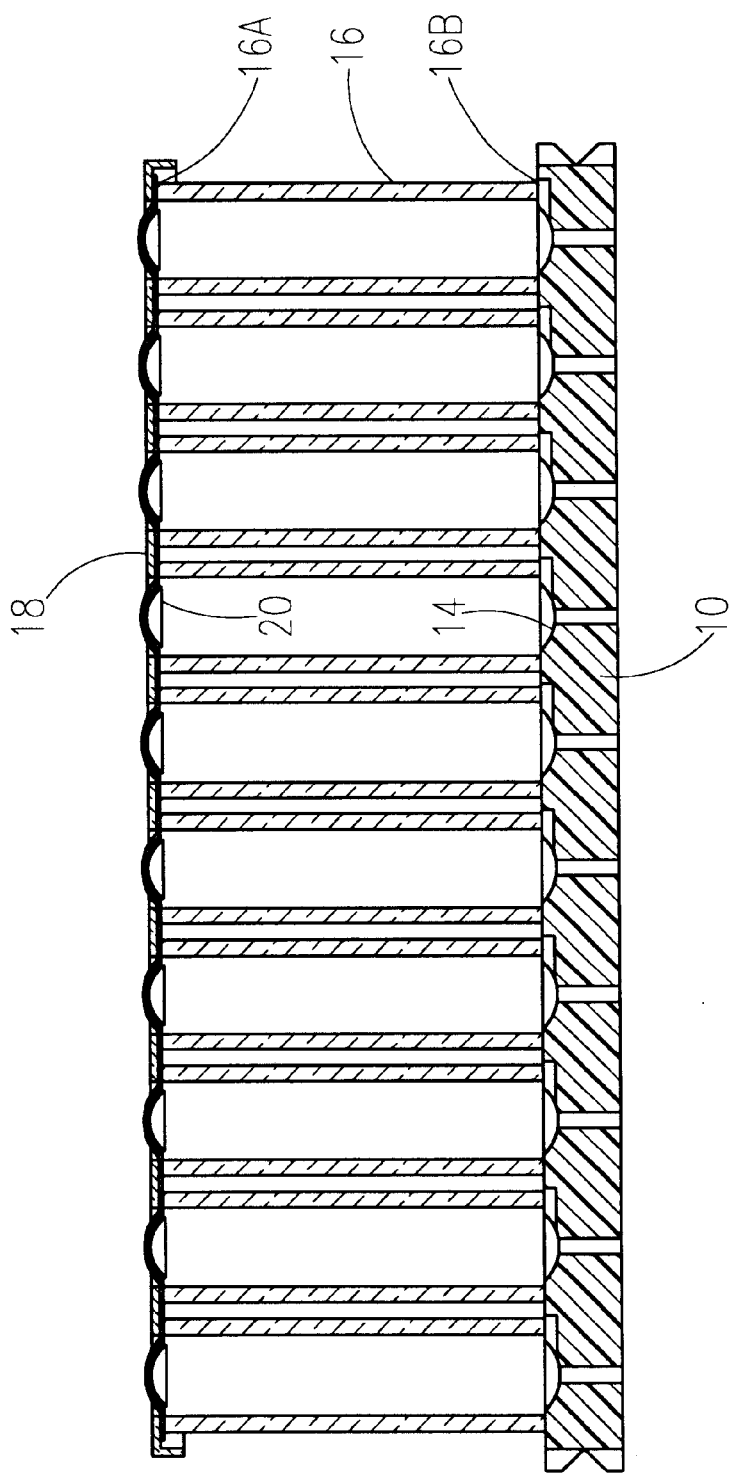
FIG. 4 is the view of FIG. 3 with the assembly of trays and tubes inverted 180°.

With the first support tray, array of tubes and lens-fixturing tray assembled in the manner described above, the assembly is rotated 180° such that the lens-fixturing tray 10 is now beneath the array of tubes 16 and the first support tray 18 with lenses 20 thereon is above the array of tubes 16 as seen in FIG. 4. This rotation of the assembly may be accomplished using any known means, and is preferably accomplished using a robotic turning assembly (not shown).

Figure 5:
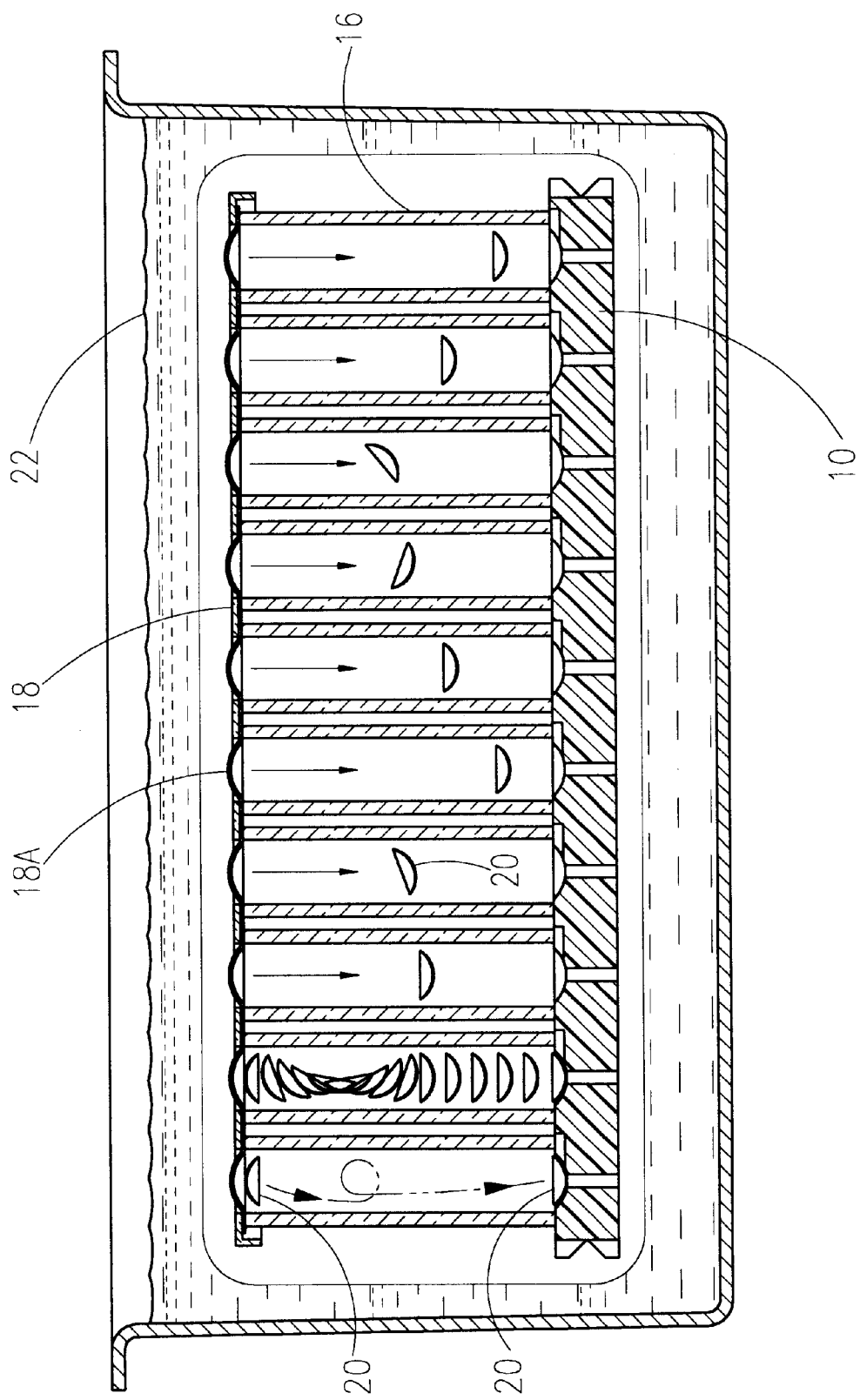
FIG. 5 is the view of FIG. 3 showing the assembly submerged in a fluid bath with the lenses shown floating downwardly through their respective fluid tubes.

With the assembly turned to the position seen in FIG. 4, the entire assembly is submerged into a bath of fluid 22 as seen in FIG. 5. The fluid enters through apertures formed in receptacles 18A of first support tray 18 (which, in the preferred embodiment, is mesh as described above) and completely floods the array of tubes 16. Once the fluid reaches lenses 20, the lenses 20 will release from their respective receptacles 18A and begin to sink downwardly through their respective tubes 16 toward lens-fixturing tray 10. The lenses 20, held in respective receptacles 18A only by simple adhesion, are easily released therefrom due to the effects of gravity and the fluid bath which break the adhesive bond. To facilitate lens release, a surfactant (e.g., 0.25% solution of TWEEN (sorbitan) and water) may be used in the bath.

FIG. 5 illustrates movement of lenses 20 downwardly through respective tubes 16. Due to the curvature of the lenses 20, the lenses will sink downwardly and come to rest in the concave side-up position in a respective receptacle 14 in lens-fixturing tray 10. It has been found that about one inch of tube length is necessary for a concave side-down lens to flip over as it sinks in the tube of fluid, coming to rest concave side-up. It is thus preferred that the tubes 16 each be of a length that is at least one inch, and more preferably about one to about five inches in length. It has furthermore been found that bubbles can interfere with the proper sinking of the lenses in their tubes. It is therefore preferred that steps are taken to reduce/eliminate bubble formation in the tubes. This may be done by controlling the rate of submerging the assembly in the bath, by degassing the fluid, and/or any other known means.

Figure 6:
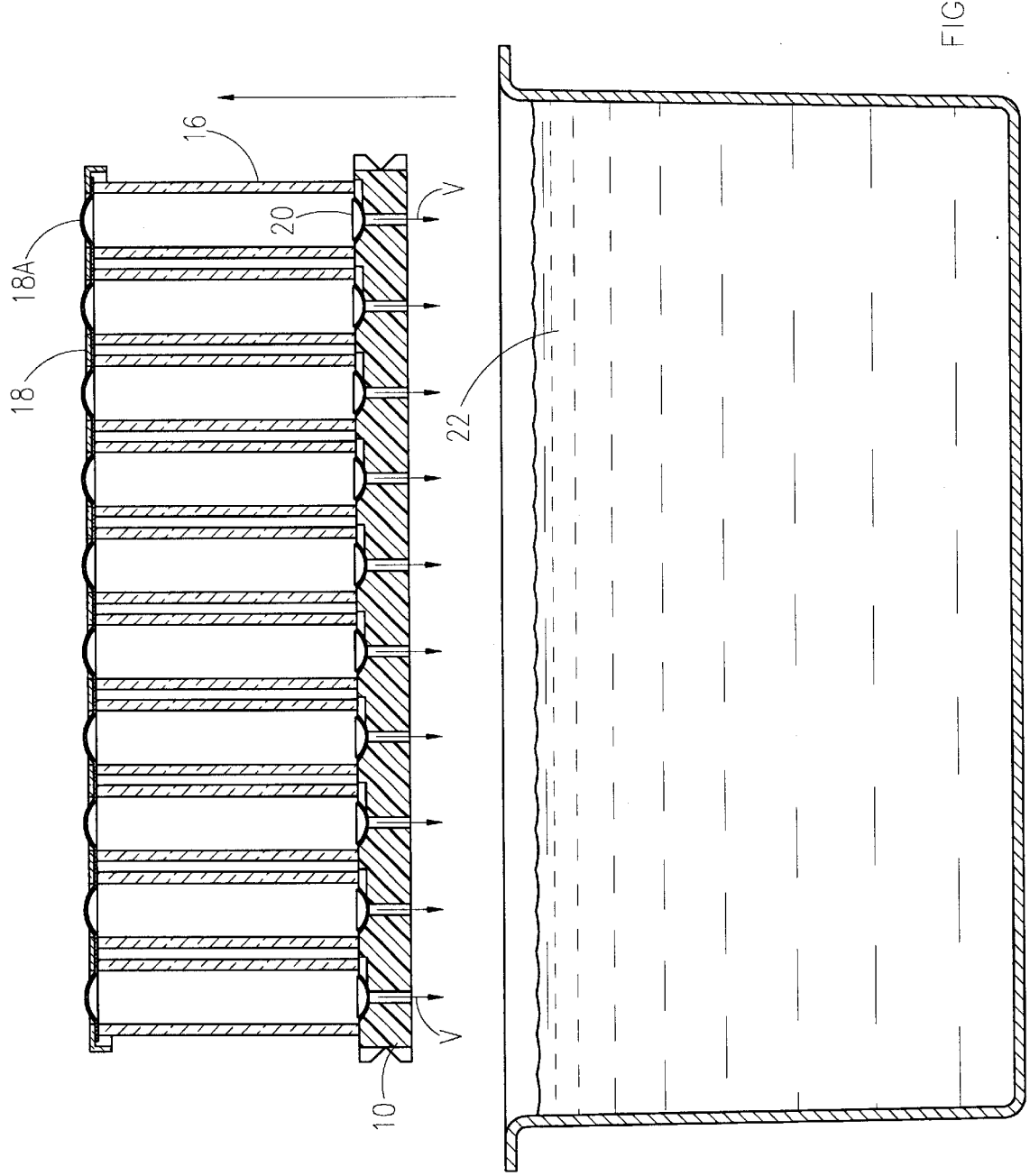
FIG. 6 is the view of FIG. 5 showing the assembly raised from the fluid bath and the lenses now positioned in the lens-fixturing tray.

Once all lenses 20 have released from first support tray 18 and settled on lens-fixturing tray 10, the assembly is raised from bath 22 as seen in FIG. 6. As the assembly is raised from the bath, a light vacuum V (e.g., about 0.25 to about 5 mmHg, and more preferably about 1 to about 3 mmHg) is drawn along each vacuum line 14C in tray 10 such that the lenses 20 are securely held within their respective concave receptacle 14A and thus prevented from further movement therein. At this time, the lens-fixturing tray 10 may be removed from the array of tubes 16.

From the above, it will be appreciated that the present invention operates to consistently orient and precisely locate all lenses 20 in their respective receptacle concavity 14A. As such, the position and orientation of lenses 20 is known thereby enabling automated picking of lenses 20 with a lens picking device 30. Any type of automated lens picking instrument may be used such as a vacuum picker or a tweezer end effector 32 shown in FIGS. 7A–7D, for example. In using a tweezer type of end effector, the radial slot 14B provides clearance for the tips of the tweezer 32 to enter and grasp the lens 20 at the edge thereof as seen best in FIGS. 7B and 7C. The picker 30 may then transport and release lens 20 at any other desired processing station (e.g., inspection, packaging, etc.). Also, since the tweezer 32 grasps the lens 20 by the edge thereof, tweezer 32 may be used to hold the lens while performing other processes on the lens, e.g., cosmetic and/or power inspection of the lens.

What is claimed is:

1. Apparatus for orienting and fixturing a contact lens having an outer diameter, said apparatus comprising:
  a) a tube having open, opposite ends and an inner diameter larger than the diameter of said contact lens;
  b) a lens-fixturing support having a concave lens receptacle formed therein for receiving and holding a contact lens in a concave side-up orientation therein, said lens-fixturing support being removably attached to said tube with said tube one end in covering relation to said concave receptacle;
  c) a fluid bath into which said tube and lens-fixturing support may be submerged with said tube extending vertically upwardly from said lens-fixturing support, whereby fluid enters and completely floods said tube;
  whereby, upon depositing a contact lens in the other end of said tube opposite said lens-fixturing support, said contact lens floats downwardly through said fluid in said tube and comes to rest in a centered, concave side-up position in said lens receptacle.

2. The apparatus of claim 1, and further comprising a first lens support tray having a lens receptacle formed therein, said first lens support tray removably attached to said tube other end with said tube in covering relation to said lens receptacle of said first lens support tray.

3. The apparatus of claim 2 wherein a plurality of said lens receptacles in said lens-fixturing tray, a plurality of said tubes, and a plurality of said lens receptacles in said first support tray are each provided in an array which align with one another whereby said apparatus may be used to simultaneously orient and fixture a respective array of contact lenses.

4. The apparatus of claim 1 wherein said fluid bath is a solution of water and a surfactant.

5. The apparatus of claim 4 wherein said surfactant is sorbitan.

6. The apparatus of claim 4 wherein said surfactant is poloxamine.

7. Apparatus for orienting and fixturing an array of contact lenses, said apparatus comprising:
   a) an array of tubes each having open ends, said tubes each having an inside diameter larger than said contact lens;
   b) a lens-fixturing support having an array of concave lens receptacles formed therein for receiving and holding a respective one of said contact lenses in a concave side-up orientation therein, said lens-fixturing support being removably attached to said tubes with one top end of said tubes aligned with and in covering relation to a respective one of said concave lens receptacles;
   c) a lens support tray have an array of lens receptacles formed therein for initially holding said contact lenses therein, respectively, said lens support tray removably mounted to said array of tubes with said ends of said tubes opposite said one end aligned with and in covering relation to said lenses and said lens receptacles in said support tray, respectively;
   d) a fluid bath into which said support tray with lenses thereon, said tubes and said lens-fixturing support may be submerged with lens-fixturing support located below said tubes and said support tray, whereby fluid enters and completely floods said tubes;
   whereby said fluid causes said contact lenses to release from their respective lens receptacles in said support tray whereupon said lenses float downwardly through a respective said tube and come to rest in a centered, concave side-up position in a respective said lens receptacle of said lens-fixturing tray.

8. The apparatus of claim 7, and further comprising a vacuum source connected to each of said lens receptacles in said lens-fixturing tray whereby said vacuum is operable to immobilize said contact lenses in their respective lens receptacles in said lens-fixturing tray once removed from said fluid bath.

9. The apparatus of claim 8, and further comprising a radial slot extending from each of said lens receptacles in said lens fixturing tray, said slot providing clearance for a lens picking device.

10. The apparatus of claim 9 wherein said lens picking device includes a tweezer end effector.

11. A method for orienting and fixturing a contact lens in a lens receptacle for picking by an automated lens picking device, said method comprising the steps of:
   a) providing a tube having opposite open ends and an inner diameter larger than the diameter of said contact lens;
   b) providing a lens receptacle at one end of said tube;
   c) flooding said tube with a fluid with said tube extending vertically upward from said lens receptacle;
   d) depositing said contact lens in the other end of said tube,
   whereby said lens floats down through said tube and conies to rest in a centered, concave side-up position in said lens receptacle.

12. The method of claim 11, and further comprising the step of providing a first lens support tray having a lens receptacle formed therein and wherein said contact lens is held prior to being deposited in said tube.

13. The method of claim 12 and further comprising the step of removably attaching said first lens support tray to said tube other end prior to flooding said tube with fluid.

14. The method of claim 13 wherein in the step of flooding said tube, a fluid bath is provided into which said lens-fixturing tray, said tube and said first lens support tray are submerged.

15. The method of claim 14, and further comprising providing an array of said lens receptacles in said lens fixturing tray and said first support tray which align with a like array of said tubes for simultaneously orienting and fixturing an array of contact lenses.

* * * * *

UNITED STATES PATENT AND TRADEMARK OFFICE
CERTIFICATE OF CORRECTION

PATENT NO. : 6,729,835 B2
DATED : May 4, 2004
INVENTOR(S) : William J. Appleton et al.

It is certified that error appears in the above-identified patent and that said Letters Patent is hereby corrected as shown below:

Column 8,
Line 28, replace "conies" with -- comes --.

Signed and Sealed this

Fifth Day of April, 2005

JON W. DUDAS
*Director of the United States Patent and Trademark Office*